US012600052B2

(12) United States Patent
Cai et al.

(10) Patent No.: US 12,600,052 B2
(45) Date of Patent: Apr. 14, 2026

(54) QUICK DISASSEMBLY ROTARY CUTTER

(71) Applicant: Saint-D industrial corporation, New Taipei City (TW)

(72) Inventors: Dengchuan Cai, Douliu City (TW); Po-Yen Yen, Douliu City (TW); Yuting Hsiao, Douliu City (TW)

(73) Assignee: SAINT-D INDUSTRIAL CORPORATION, New Taipei City (TW)

(*) Notice: Subject to any disclaimer, the term of this patent is extended or adjusted under 35 U.S.C. 154(b) by 133 days.

(21) Appl. No.: 18/802,782

(22) Filed: Aug. 13, 2024

(65) Prior Publication Data

US 2026/0008194 A1 Jan. 8, 2026

(30) Foreign Application Priority Data

Jul. 5, 2024 (TW) ................................ 113207237

(51) Int. Cl.
*B26B 25/00* (2006.01)

(52) U.S. Cl.
CPC ................................ *B26B 25/005* (2013.01)

(58) Field of Classification Search
None
See application file for complete search history.

(56) References Cited

U.S. PATENT DOCUMENTS

| | | | | | |
|---|---|---|---|---|---|
| 5,299,355 | A * | 4/1994 | Boda | B26B 5/003 | 30/162 |
| 5,355,588 | A * | 10/1994 | Brandenburg, Jr | B26B 29/02 | 30/292 |
| 5,711,077 | A * | 1/1998 | Schulz | B26B 25/005 | 30/319 |
| 6,438,850 | B2 * | 8/2002 | Young | B26B 25/005 | 30/162 |
| 7,073,263 | B2 * | 7/2006 | Kawasaki | B26B 25/005 | 30/292 |
| 8,590,163 | B1 * | 11/2013 | Bagley | B26B 25/005 | 30/286 |
| 2006/0236551 | A1 * | 10/2006 | Chang | B26B 25/005 | 30/319 |
| 2026/0008194 | A1 * | 1/2026 | Cai | B26B 25/005 | |

* cited by examiner

*Primary Examiner* — Hwei-Siu C Payer

(74) *Attorney, Agent, or Firm* — Withrow + Terranova, PLLC; Vincent K. Gustafson

(57) ABSTRACT

A quick disassembly rotary cutter has a round blade, a casing, a fixed shaft, and a clamp part. The round blade is mounted on one surface of the casing, and selectively protrudes from the casing. The fixed shaft penetrates through the round blade and the casing, and the round blade is mounted on the fixed shaft. The clamp part is mounted in the casing and has a notch and at least one push rod. The notch is located on an end of the clamp part, and the fixed shaft can be clamped in the notch. The push rod is located on one surface of the clamp part, protrudes outward from the surfaces of the clamp part, and penetrates the casing. The clamp part moves away from the fixed shaft to disengage the fixed shaft from the notch when the push rod is pushed away from the fixed shaft.

10 Claims, 12 Drawing Sheets

QUICK DISASSEMBLY ROTARY CUTTER

BACKGROUND OF THE INVENTION

1. Field of the Invention

The present invention relates to a rotary cutter, especially to a quick disassembly rotary cutter that can be dismantled quickly.

2. Description of the Prior Arts

Rotary cutters are often used for cutting paper or fabrics, etc. Compared with general scissors, the rotary cutters can keep the cutting surface flat and are easier to adjust the cut lines, and users can adjust the direction of the rotary cutters to cut curved lines.

Most of the conventional rotary cutters are screwed on a handle. When the blade needs to be replaced, the screw needs to be unfastened, and there may be a risk of injury when fastening the screw. In addition, to see the direction of the blade more clearly when using a rotary cutter, the user will face the side with the blade. However, the conventional rotary cutters are mostly for right-handed people, and left-handed people often cannot see the blade when using the rotary cutter, which is likely to cause danger.

To overcome the shortcomings, the present invention provides a quick disassembly rotary cutter to mitigate or obviate the aforementioned problems.

SUMMARY OF THE INVENTION

The main objective of the present invention is to provide a quick disassembly rotary cutter that solves the problem that the screw must be unfastened when replacing the blade, and the problem that left-handers often cannot see the blade during operation.

The quick disassembly rotary cutter comprises a casing, a round blade, a fixed shaft, and a clamp part. The round blade is mounted on a surface of the casing and selectively protrudes from the casing. The fixed shaft penetrates through the round blade and the casing, and the round blade is mounted on the fixed shaft.

The clamp part is mounted in the casing and comprises a notch and at least one push rod. The notch is located on an end of the clamp part, and the fixed shaft is capable of being clamped in the notch. The at least one push rod is located on a surface of the clamp part, protrudes outward from the surfaces of the clamp part, and penetrates the casing. The clamp part moves away from the fixed shaft to disengage the fixed shaft from the notch when the push rod is pushed away from the fixed shaft.

The advantage of the present invention lies in the design of the clamp part, which allows the round blade to be removed by simply toggling the push rod without rotating the screw. In addition, with the accommodation recesses on both sides of the casing, the two push rods penetrate the casing, and the block and the button on the side of the casing make the quick disassembly rotary cutter are suitable for both left-handed and right-handed people without losing sight of the round blade or failing to press the block and the button.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
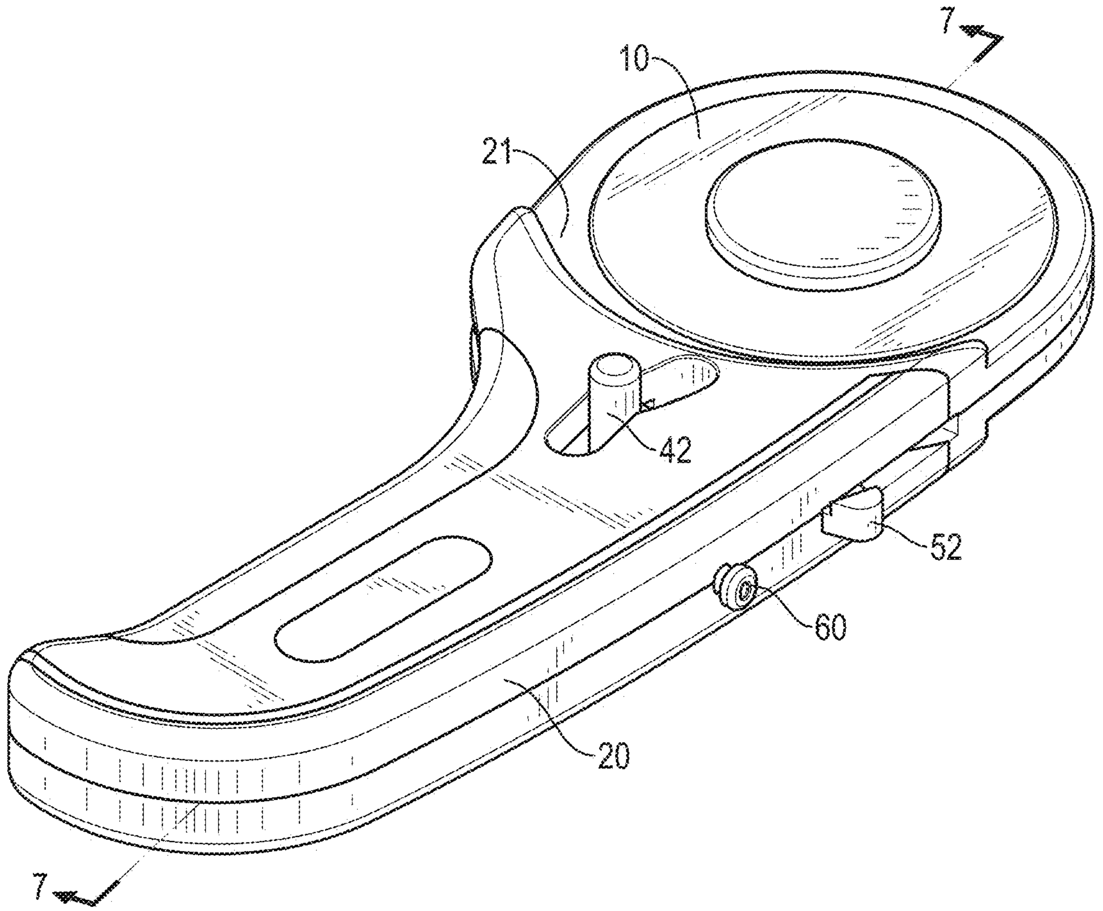
FIG. 1 is a perspective view of a quick disassembly rotary cutter in a retracting state in accordance with the present invention.
Figure 2:
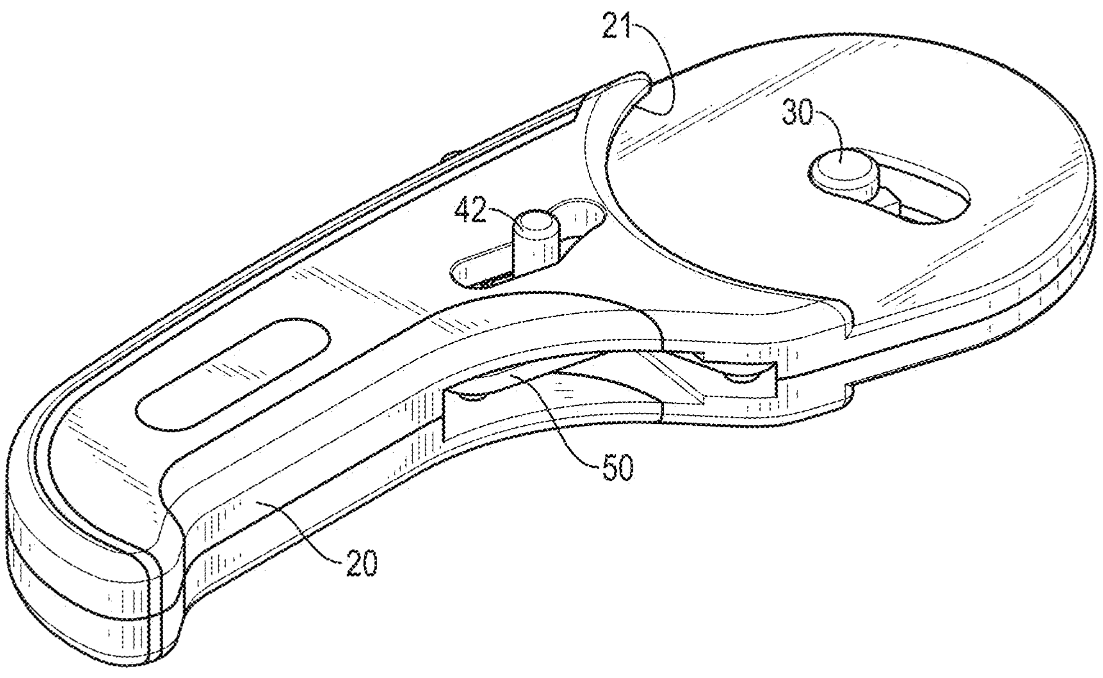
FIG. 2 is a perspective view of the quick disassembly rotary cutter in the retracting state in FIG. 1.
Figure 3:
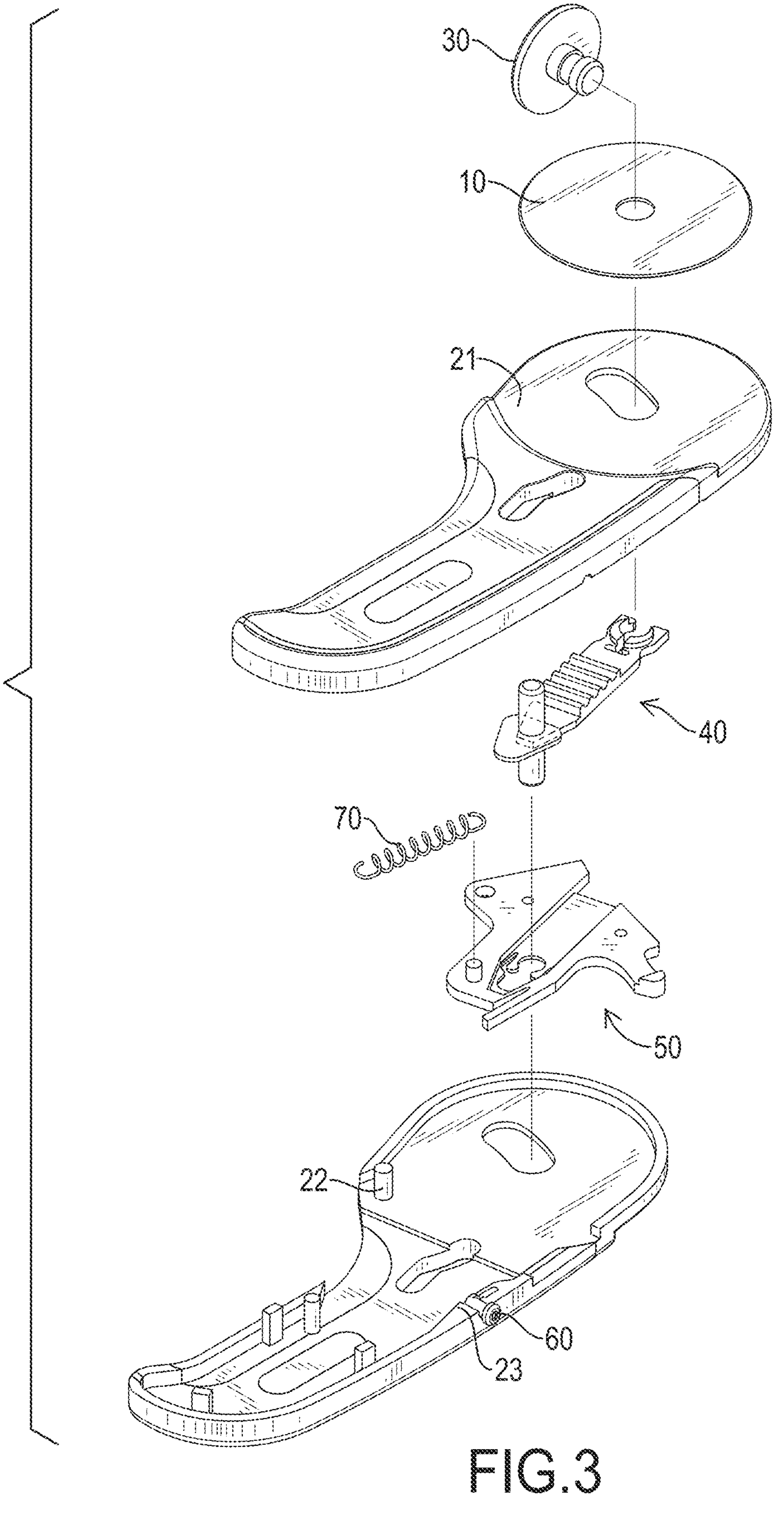
FIG. 3 is an exploded view of the quick disassembly rotary cutter in FIG. 1.
Figure 4:
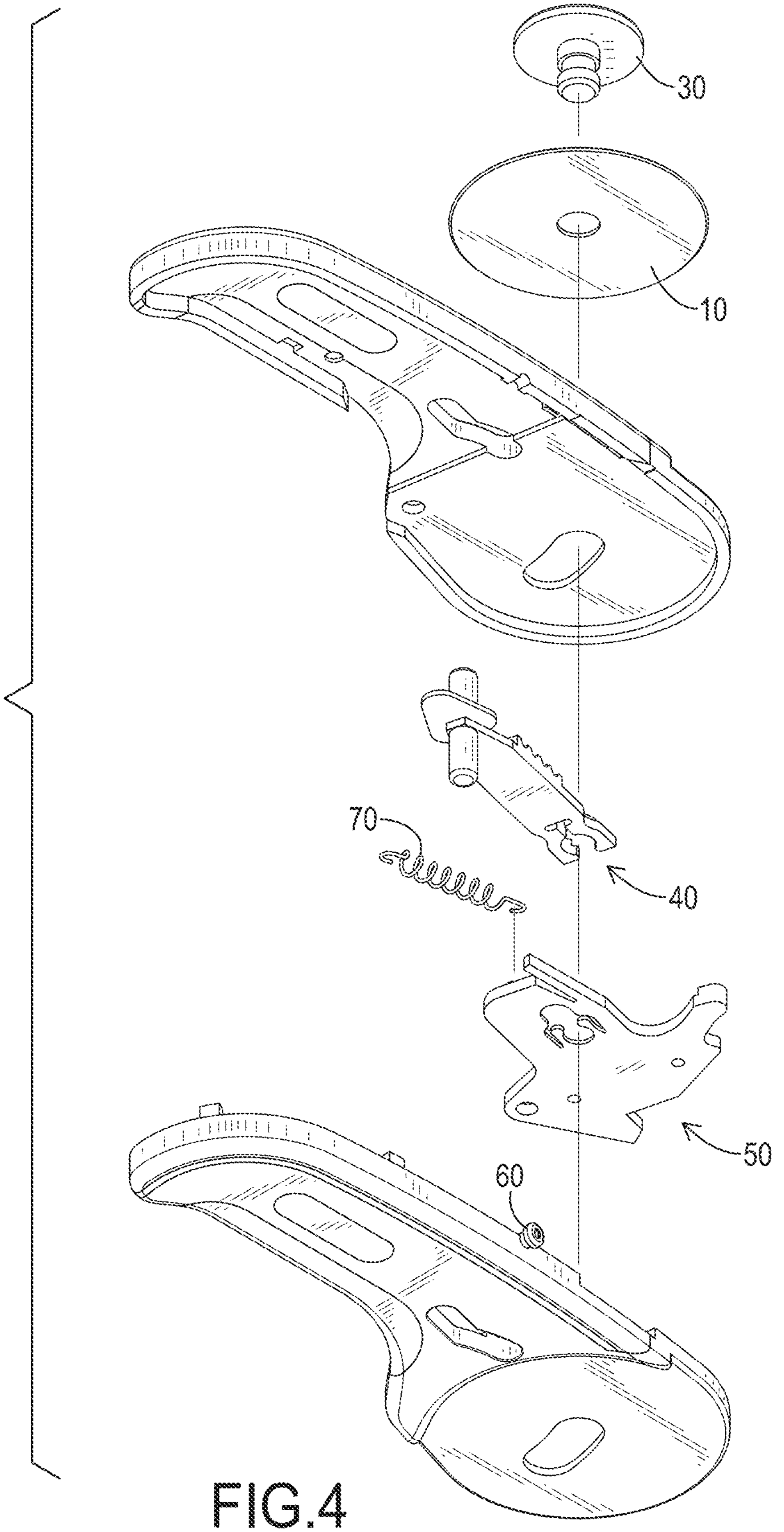
FIG. 4 is an exploded view of the quick disassembly rotary cutter in FIG. 1.

With reference to FIG. 1 to FIG. 4, a quick disassembly rotary cutter in accordance with the present invention comprises a round blade 10, a casing 20, a fixed shaft 30, a clamp part 40, a swing part 50, a button 60, and an elastic part 70.

Figure 5:
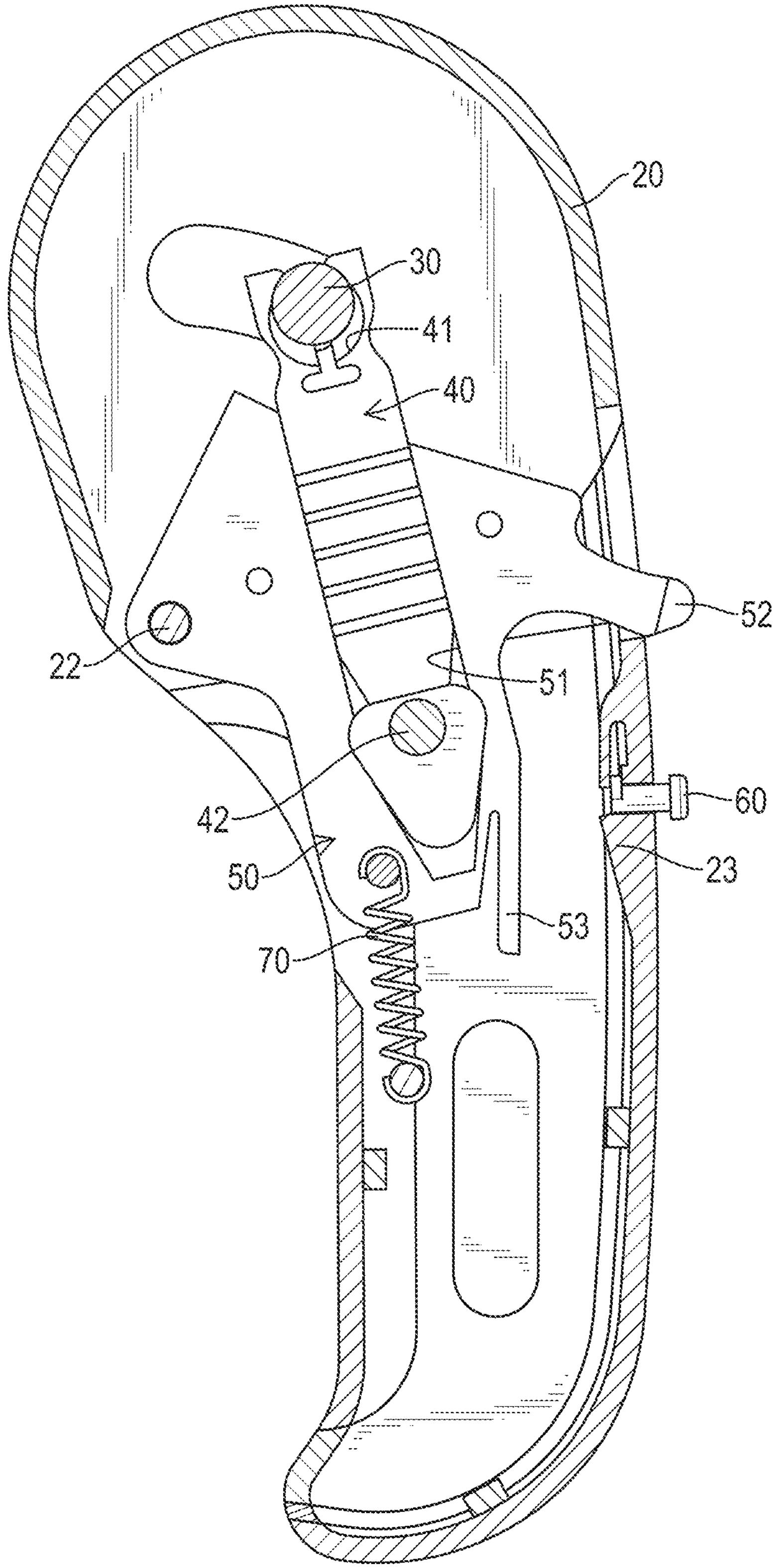
FIG. 5 is a cross-sectional view of the quick disassembly rotary cutter in the retracting state in FIG. 1.
Figure 6:
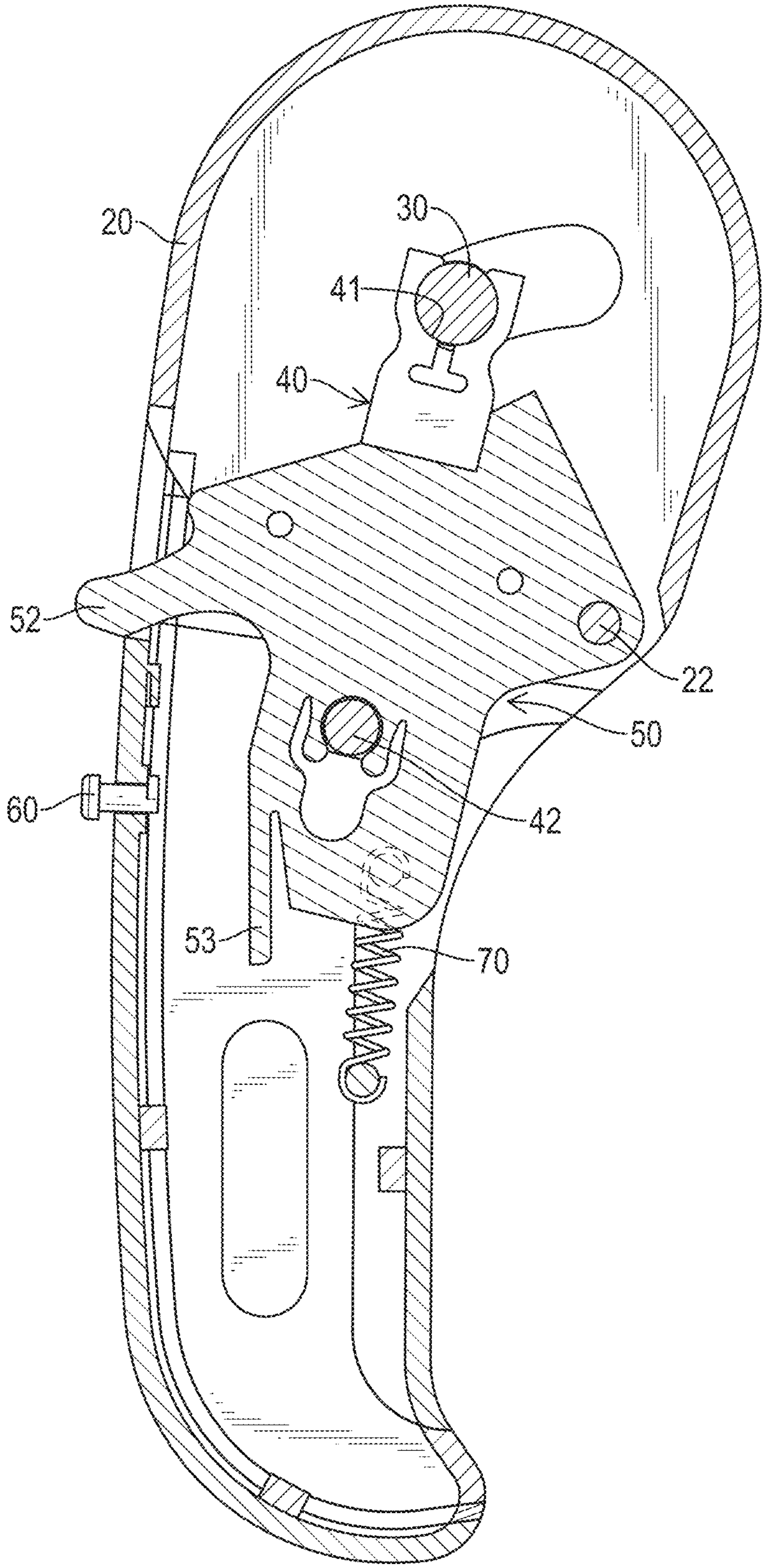
FIG. 6 is a cross-sectional view of the quick disassembly rotary cutter in the retracting state in FIG. 1.
Figure 7:
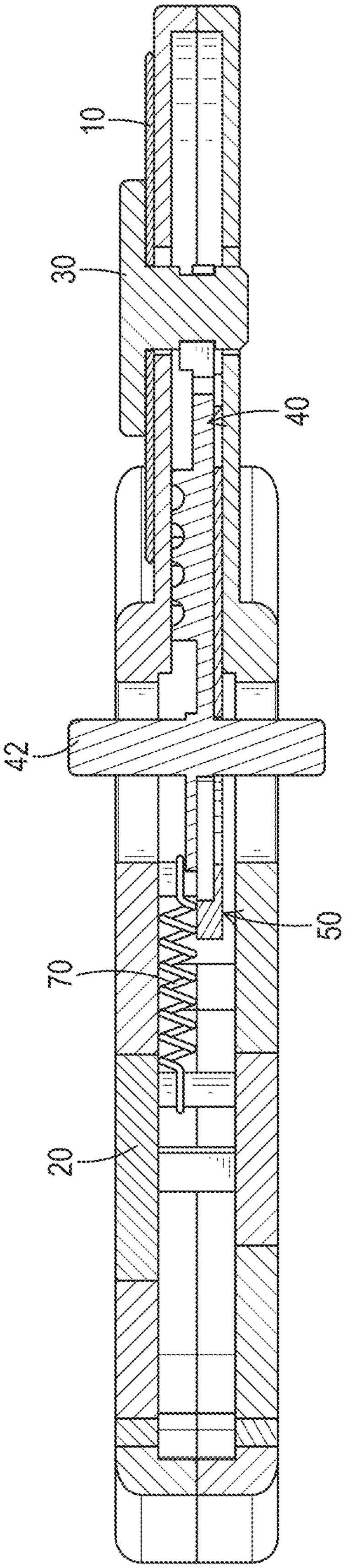
FIG. 7 is a cross-sectional view of the quick disassembly rotary cutter along the cut line in FIG. 1.

With reference to FIG. 5 to FIG. 7, the casing 20 comprises two surfaces opposite each other. The round blade 10 is mounted on one of the surfaces of the casing 20, and selectively protrudes from the casing 20. The casing 20 comprises two accommodation recesses 21, a rotation shaft 22, and a platform 23. The two accommodation recesses 21 are respectively mounted on the two surfaces of the casing 20, and the round blade 10 is mounted in one of the accommodation recesses 21. The rotation shaft 22 and the platform 23 are both mounted in an inner surface of the casing 20.

The fixed shaft 30 penetrates through the round blade 10 and the casing 20, and the round blade 10 is mounted on the fixed shaft 30. The clamp part 40 is mounted in the casing 20 and comprises two surfaces, a notch 41 and at least one push rod 42. The two surfaces of the clamp part 40 are opposite each other. The notch 41 is located on an end of the clamp part 40, and the fixed shaft 30 can be clamped in the notch 41. The at least one push rod 42 is located on one of the surfaces of the clamp part 40. In this embodiment, the clamp part 40 comprises two push rods 42 respectively located on the two surfaces of the clamp part 40. The push rods 42 protrude outward from the surfaces of the clamp part 40 and penetrate the casing 20. The clamp part 40 moves away from the fixed shaft 30 to disengage the fixed shaft 30 from the notch 41 when the push rods 42 are pushed away from the fixed shaft 30.

The swing part 50 is mounted in the casing 20 and is pivotably mounted on the rotation shaft 22, so that the swing part 50 can swing with the rotation shaft 22 as the axis. The swing part 50 comprises a recess 51, a block 52, and a fixed body 53. The clamp part 40 is mounted in the recess 51, so that the clamp part 40 can swing during the swing part 50 swinging. The block 52 is mounted on one side of the swing part 50 and is located on opposite sides of the rotation shaft 22. The block 52 protrudes from one side of the casing 20. Therefore, when a user pushes the block 52 from the outside of the casing 20, the swing part 50 is able to swing along with the push of the block 52. The fixed body 53 is mounted on the side of the swing part 50 same as the block 52. When the swing part 50 swings with the rotation shaft 22 as the axis, the fixed body 53 can be fixed on the platform 23 of the casing 20.

Figure 8:
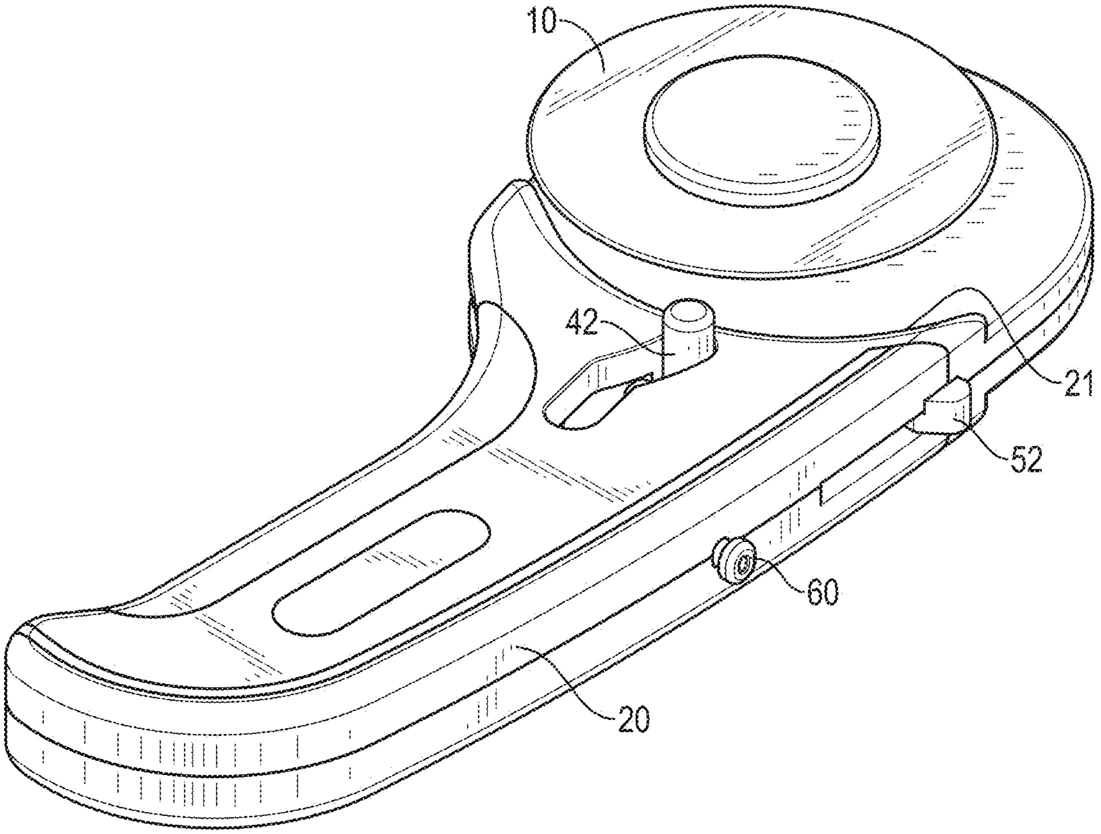
FIG. 8 is a perspective view of the quick disassembly rotary cutter in a working state in FIG. 1.
Figure 9:
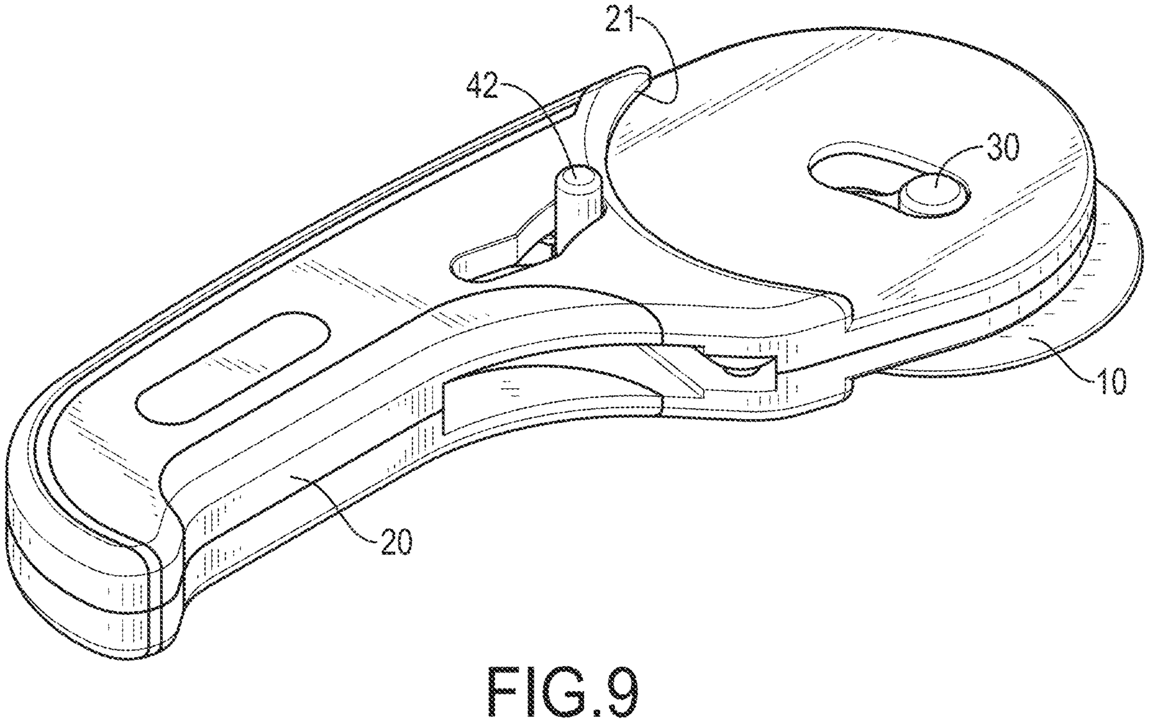
FIG. 9 is a perspective view of the quick disassembly rotary cutter in the working state in FIG. 1.
Figure 10:
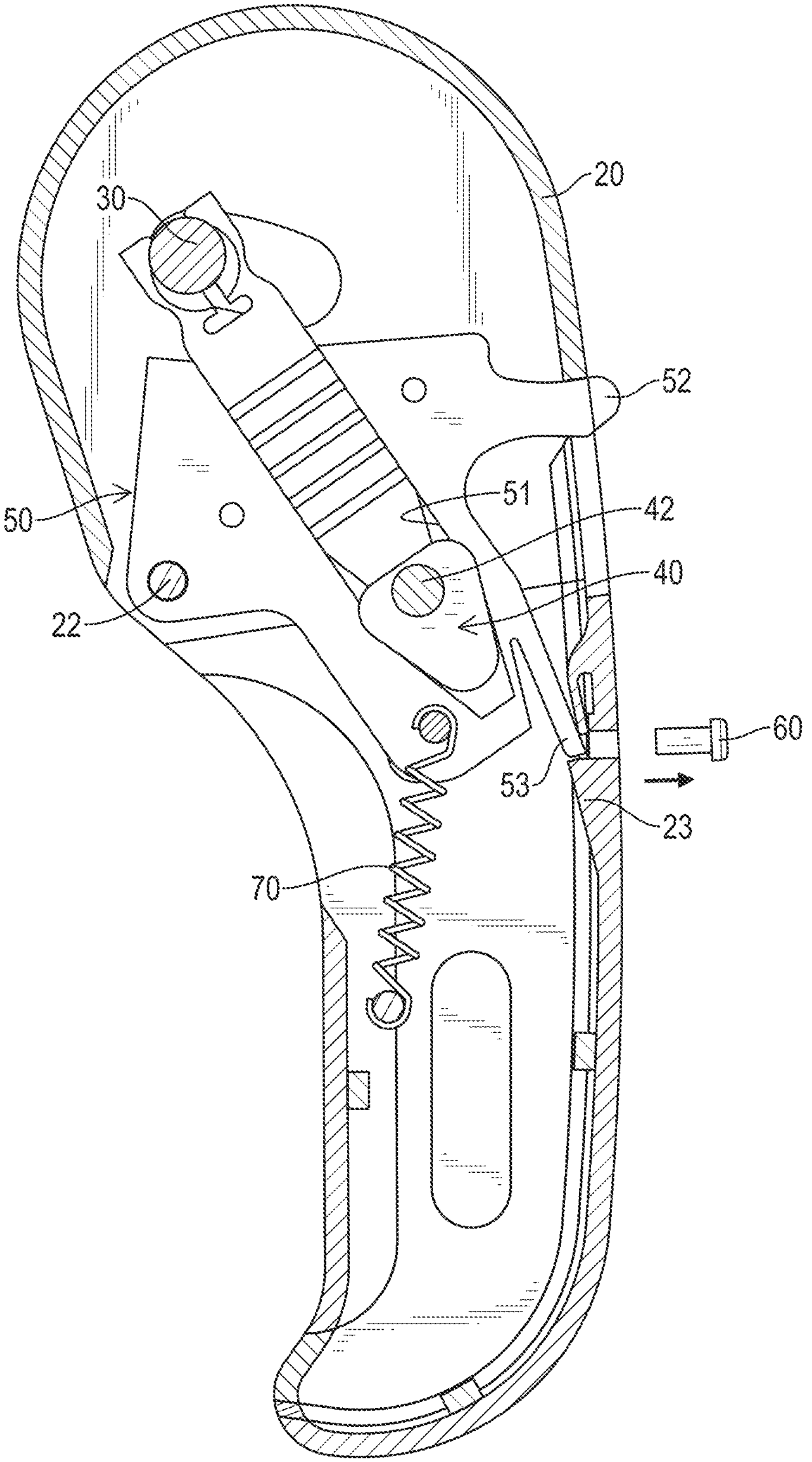
FIG. 10 is a cross-sectional view of the quick disassembly rotary cutter in the working state in FIG. 1.
Figure 11:
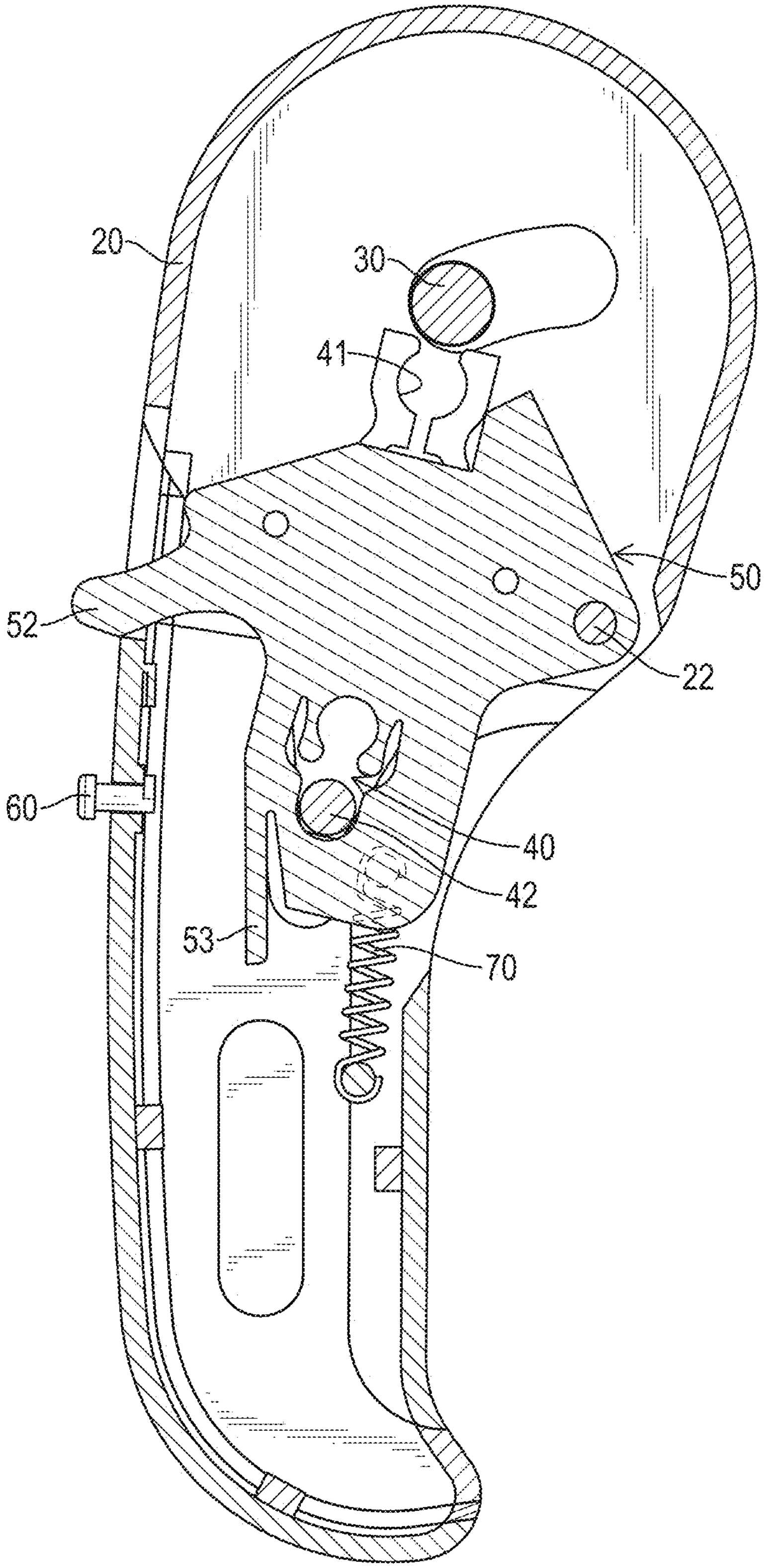
FIG. 11 is a cross-sectional view of the quick disassembly rotary cutter in an unload state in FIG. 1.
Figure 12:
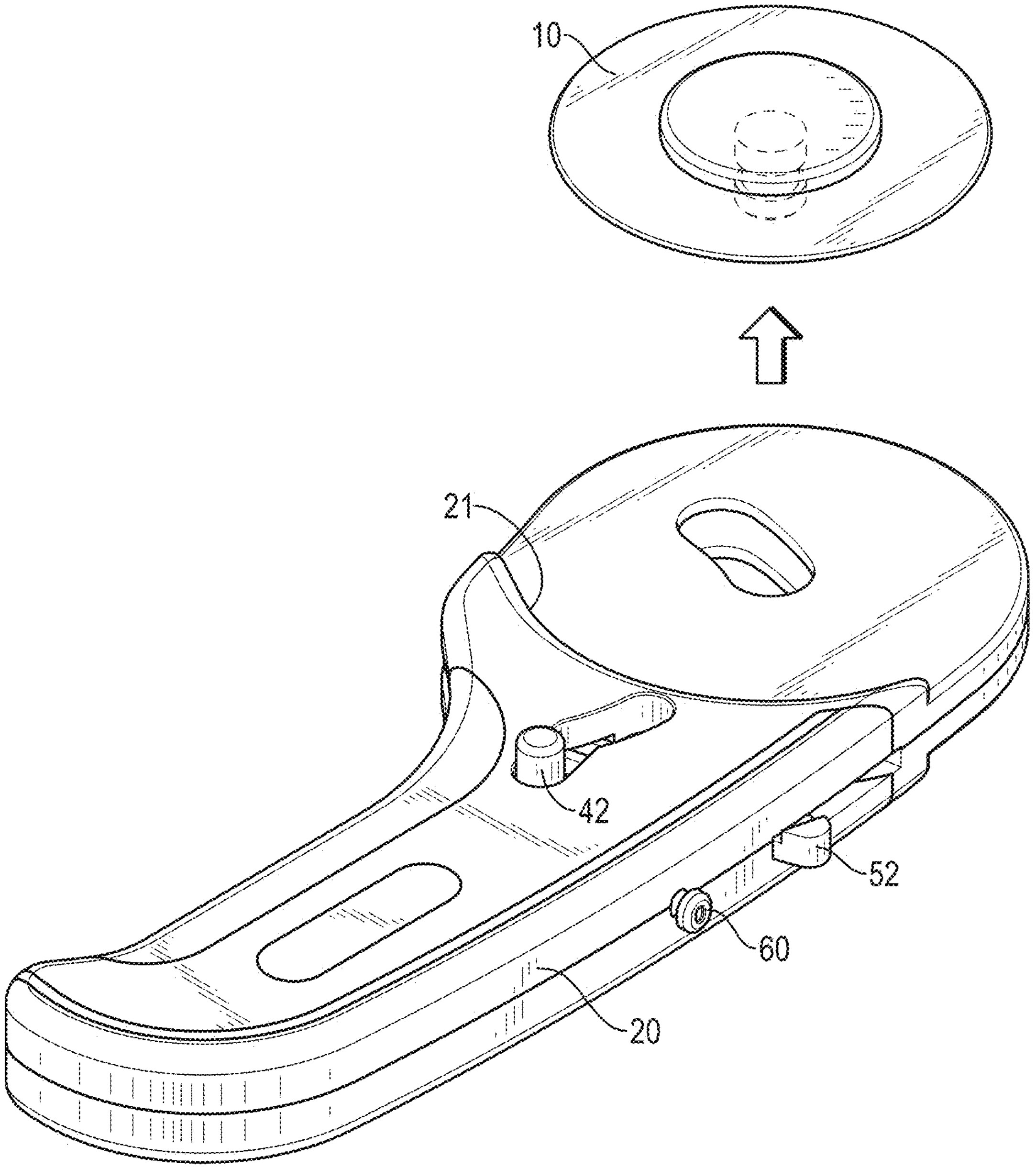
FIG. 12 is an operational view of the quick disassembly rotary cutter removing a round blade.

The quick disassembly rotary cutter comprises a retracting state, a working state, and an unload state. When the quick disassembly rotary cutter is in the retracting state, the round blade 10 is selectively located in one of the accommodation recesses 21 and is retracted on the casing 20. With reference to FIG. 8 to FIG. 10, when the quick disassembly rotary cutter is in the working state, the round blade 10 protrudes from the casing 20 and the fixed body 53 is secured to the platform 23 of the casing 20 so that the swing part 50 cannot swing. With reference to FIG. 11 and FIG. 12, when the quick disassembly rotary cutter is in the unload state, the clamp part 40 is moved away from the fixed shaft 30 so that the fixed shaft 30 is disengaged from the notch 41 of the clamp part 40, which in turn allows the fixed shaft 30 and the round blade 10 to be removed from the casing 20.

The button 60 is mounted through one side of the casing 20. When the swing part 50 swings to the working position, the button 60 abuts the fixed body 53. When the button 60 is moved toward the fixed body 53, the fixed body 53 is pushed away from the platform 23, so that the swing part 50 is not restricted from swinging by the platform 23. In this embodiment, the block 52 and the button 60 are both mounted on the same side of the casing 20. Therefore, no matter in which accommodation recess 21 the round blade 10 is placed, the user can touch the block 52 and the button 60. Two ends of the elastic part 70 are respectively connected to the swing part 50 and the inner surface of the casing 20, and the elastic part 70 tends to pull the swing part 50 to the retracting position.

When using the quick disassembly rotary cutter, it is necessary to push the block 52 to the side of the casing 20, so that the swing part 50 can swing to the working position, allowing the round blade 10 to protrude out of the casing 20. Meanwhile, the fixed body 53 engages in the platform 23 of the casing 20, so that when the round blade 10 is used for cutting, the swing part 50 will not swing back to the retracting position of the round blade 10.

To return the round blade 10 to the retracting position, the user needs to press the button 60 located in the side of the casing 20. The button 60 will push the fixed body 53 away from the platform 23 so that the swing part 50 is not limited to the platform 23. Meanwhile, the elastic part 70 will pull the swing part 50 back to the retracting position.

To replace the round blade 10, the quick disassembly rotary cutter needs to be in the retracting position, and then the user pulls the two push rods 42 to move the push rod 42 away from the fixed shaft 30, thereby disengaging the fixed shaft 30 from the notch 41 of the clamp part 40. When the fixed shaft 30 is disengaged from the notch 41 of the clamp part 40, the fixed shaft 30 and the round blade 10 can be disengaged from the casing 20, thereby replacing the round blade 10.

The advantage of the present invention lies in the design of the clamp part 40, which allows the round blade 10 to be removed by simply toggling the push rod 42 without rotating the screw. In addition, the accommodation recess 21 on both sides of the casing 20, the two push rods 42 penetrating the casing 20, and the block 52 and the button 60 on the side of the casing 20 make the quick disassembly rotary cutter suitable for both left-handed and right-handed people without losing sight of the round blade 10 or failing to press the block 52 and the button 60.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A quick disassembly rotary cutter comprising:
a casing having two surfaces opposite each other;
a round blade mounted on one of the surfaces of the casing, and selectively protruding from the casing;
a fixed shaft penetrating through the round blade and the casing, and the round blade mounted on the fixed shaft; and
a clamp part mounted in the casing, and comprising:
two surfaces opposite each other;
a notch located on an end of the clamp part, and the fixed shaft capable of being clamped in the notch; and
at least one push rod located on one of the surfaces of the clamp part, protruding outward from said one of the surfaces of the clamp part, and penetrating the casing; the clamp part moving away from the fixed shaft to disengage the fixed shaft from the notch when the push rod is pushed away from the fixed shaft.

2. The quick disassembly rotary cutter as claimed in claim 1, wherein,
the casing further comprises:
two accommodation recesses mounted on two opposite surfaces of the casing, and the round blade mounted in one of the accommodation recesses;
the at least one push rod includes two said push rods;
the two push rods are respectively located on the two surfaces of the clamp part, protrude outward from the two surfaces of the clamp part, and penetrate the casing.

3. The quick disassembly rotary cutter as claimed in claim 1, wherein:
the quick disassembly rotary cutter further comprises:
a swing part mounted in the casing, and comprising:
a recess, the clamp part mounted in the recess, and being capable of swinging during the swing part swinging;
a block mounted in one side of the swing part and protruding from one side of the casing;
the casing further comprises:
a rotation shaft mounted on an inner surface of the casing and located on another side of the casing, said another side being opposite the block, and the swing part pivotably mounted on the rotation shaft such that the swing part swings with the rotation shaft as an axis;
wherein when the quick disassembly rotary cutter is in a retracting state, the swing part swings to a retracting position, such that the round blade is selectively mounted on one of the surfaces of the casing and is retracted on the casing;

when the quick disassembly rotary cutter is in a working state, the swing part swings to a working position, such that the round blade protrudes from the casing.

4. The quick disassembly rotary cutter as claimed in claim 2, wherein:

the quick disassembly rotary cutter further comprises:

a swing part mounted in the casing, and comprising:

a recess, the clamp part mounted in the recess, and being capable of swinging during the swing part swinging;

a block mounted in one side of the swing part and protruding from one side of the casing;

the casing further comprises:

a rotation shaft mounted on an inner surface of the casing and located on another side of the casing, said another side being opposite the block, and the swing part pivotably mounted on the rotation shaft such that the swing part swings with the rotation shaft as an axis;

wherein when the quick disassembly rotary cutter is in a retracting state, the swing part swings to a retracting position, such that the round blade is selectively mounted on one of the surfaces of the casing and is retracted on the casing;

when the quick disassembly rotary cutter is in a working state, the swing part swings to a working position, such that the round blade protrudes from the casing.

5. The quick disassembly rotary cutter as claimed in claim 3, wherein, the swing part comprises:

a fixed body mounted on one side of the swing part, and the fixed body located on the same side as the block;

the casing comprises:

a platform mounted on an inner surface of the casing; wherein when the swing part swings to the working position, the fixed body is located on the platform and restricted from swinging back to the retracting position of the swing part by the platform.

6. The quick disassembly rotary cutter as claimed in claim 4, wherein, the swing part comprises:

a fixed body mounted on one side of the swing part, and the fixed body located on the same side as the block;

the casing comprises:

a platform mounted on an inner surface of the casing; wherein when the swing part swings to the working position, the fixed body is located on the platform and restricted from swinging back to the retracting position of the swing part by the platform.

7. The quick disassembly rotary cutter as claimed in claim 5 further comprising:

a button mounted through the side of the casing; wherein when the quick disassembly rotary cutter is in the working state, the button abuts the fixed body; when the button moves toward the fixed body, the fixed body is pushed away from the platform.

8. The quick disassembly rotary cutter as claimed in claim 6 further comprising:

a button mounted through the side of the casing; wherein when the quick disassembly rotary cutter is in the working state, the button abuts the fixed body; when the button moves toward the fixed body, the fixed body is pushed away from the platform.

9. The quick disassembly rotary cutter as claimed in claim 5 further comprising:

an elastic part, two ends of the elastic part respectively connected to the swing part and the inner surface of the casing, and the elastic part tending to pull the swing part to the retracting position.

10. The quick disassembly rotary cutter as claimed in claim 8 further comprising:

an elastic part, two ends of the elastic part respectively connected to the swing part and the inner surface of the casing, and the elastic part tending to pull the swing part to the retracting position.

* * * * *